United States Patent
Xiang et al.

(10) Patent No.: US 7,437,453 B2
(45) Date of Patent: Oct. 14, 2008

(54) REMOTELY MONITORING NETWORK UTILIZING EXPRESSION CONTAINING COMBINATION OBJECT AND MULTIPLE INDEPENDENT OBJECTS

(75) Inventors: Haizhou Xiang, Shenzhen (CN); Zhenfeng Lv, Shenzhen (CN); Hongfei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 736 days.

(21) Appl. No.: 10/482,359

(22) PCT Filed: Apr. 29, 2002

(86) PCT No.: PCT/CN02/00305

§ 371 (c)(1), (2), (4) Date: Dec. 29, 2003

(87) PCT Pub. No.: WO03/003238

PCT Pub. Date: Jan. 9, 2003

(65) Prior Publication Data

US 2004/0186693 A1 Sep. 23, 2004

(30) Foreign Application Priority Data

Jun. 28, 2001 (CN) ................. 01 1 22529

(51) Int. Cl.
*G06F 15/16* (2006.01)
*G06F 15/173* (2006.01)
*G06F 15/177* (2006.01)

(52) U.S. Cl. .............. 709/224; 709/203; 717/127; 715/736; 719/315

(58) Field of Classification Search ......... 709/200–205, 709/217–228, 229; 719/310, 311–318; 717/127; 715/736; 700/80
See application file for complete search history.

(56) References Cited

U.S. PATENT DOCUMENTS

| | | | | |
|---|---|---|---|---|
| 5,758,072 A | * | 5/1998 | Filepp et al. ................. | 709/220 |
| 6,085,237 A | | 7/2000 | Durham et al. | |
| 6,363,421 B2 | * | 3/2002 | Barker et al. ................. | 709/223 |
| 6,757,901 B1 | * | 6/2004 | McCloghrie et al. ......... | 719/318 |
| 7,143,153 B1 | * | 11/2006 | Black et al. .................. | 709/223 |

FOREIGN PATENT DOCUMENTS

EP 0831617 A2 3/1998

* cited by examiner

*Primary Examiner*—Haresh N Patel

(57) ABSTRACT

The invention discloses a method for remotely monitoring method of computer network. It is an improvement of the RMON (Remote Network Monitoring) alarm group. The method mainly includes: Setting an alarm-extended table in the RMON alarm group; Defining a combination object in MIB (Management Information Base) that is an expression with two or more than two independent objects; A network management center sends a Set-Request packet with the expression to managed devices to initiate a RMON monitoring process; The expression is calculated and its value is compared with a threshold; When calculated value of the expression exceeds the threshold, processing steps preset by the network management center are taken. The invention supports SNMP (Simple Network Management Protocol), optimizes network performance, and saves network bandwidth and CPU resource of the network management center.

7 Claims, 2 Drawing Sheets

REMOTELY MONITORING NETWORK UTILIZING EXPRESSION CONTAINING COMBINATION OBJECT AND MULTIPLE INDEPENDENT OBJECTS

Cross References To Related Applications

This application claims foreign priority China 0122529.7 Jun. 28, 2001 under 35U.S.C. 119(a)-(d) or (f), and PCT/CN02/00305 Apr. 29, 2002 under 35 U.S.C. 371.

FIELD OF THE TECHNOLOGY

The invention generally relates to a management method of computer network devices, particularly to a management method for device that supports the Simple Network Management Protocol (SNMP).

BACKGROUND OF THE INVENTION

Along with increase of expansion, complexity and device multiplicity of a computer network, network management is getting important in network construction, operation and maintenance. Network management provides an effective method to monitor, control and manage network resources in order to operate a computer network safely, reliably and effectively and to get an optimized network performance.

SNMP is a popular network management protocol for Internet based on TCP/IP protocol suite. With SNMP, the operation of a network can be monitored and analyzed. Through a network management application program, a network can be managed and maintenance. Nevertheless, the first generation SNMPv1, which has been popularly used at present, has some limitations. For example:

A polling method is used to sample information in SNMP, which not only wastes valuable bandwidth but also increases traffic load of a network. In a large-scale network, a great amount of management packets for communication are produced by the polling method, which will make a congestion or even block in a network;

A distributive management mode with manager-process to manager-process is not supported in SNMP, so all the task sampling information is concentrated on the network management center, and then the network management application program will be a bottle neck of the network;

Management information base (MIB) is a database of information about a managed device, such as router, switch and network server etc. The standard MIB-II (specified in RFC 1213) and vendor-specific MIB are used for providing local information of a single device, such as state of the device interfaces, information traffic and number of error packets.

It is difficult to obtain management information of a network segment from the protocols mentioned above. As Internet is getting larger, it is necessary to control a network segment performance. Thereof, it cannot satisfy management of large-scale Internet only by using standard MIB or vendor-specific MIB to obtain management information of network devices.

In order to increase transmitting validity of management information, decrease load of management application program, and satisfy monitoring requirement of network segment performance, Internet Engineering Task Force (IETF) proposed a remote network monitoring (RMON) protocol.

In RMON, a scheme of remote monitoring network segment by interface is provided. RMON expands the SNMP and defines interface between management application program based on SNMP in network management center and agent-process in managed devices. With RMON, monitoring data traffic of one network segment or all networks is implemented.

RMON provides a useful method for monitoring operation of sub-network. The communication traffic between manager-process and agent-process can be reduced. Through RMON, all kinds of traffic information of network segment can be tracked and monitored; such as total number of packets on a network segment during an interval, total number of correct packets sent to a host computer during an interval etc. Also, through RMON, proactive monitoring can be made on a network. A device, which applies RMON technology, can monitor network performance and record status on its own initiative. When there is a fault in some Internet such as congestion, the fault information can be informed to management application program in time, and then the management application program deal with it so that the fault can be eliminated.

Usually, cooperation of the alarm group and event group together can make proactive management. For example, a management application program can configure a managed device with RMON alarm and event groups to monitor an object of an interface of the managed device. For example, number of input bytes on an interface (named ifInOctects in MIB) is monitored; when total number of ifInOctects during one minute exceeds a threshold, the managed device (RMON agent-process) will send an alarm to the management application program. In this case, the monitoring function is transferred to and executed at a managed device. Therefore, various statistic information polling is avoided, network bandwidth is save and working load of a management application program is decreased.

The RMON alarm group can only monitor an independent object, such as number of input bytes of an interface ifInOctects above, but cannot monitor combination information of multiple objects. In practice, it is necessary to monitor an expression of several independent objects. For example, a management application program may monitor an error percentage of input packets of an interface in a managed device, and specifies that an alarm must be informed to management application program if the error percentage is more than 10% during a 10 minutes period of time. The error percentage of input packets of an interface is an expression of three independent objects, as shown in the following:

Error percentage of interface input packets=ifInErrors/(ifInUcastPkts+ifInNUcastPkts).

The expression includes three objects of the interface: number of input error packets ifInErrors, number of input uncast packets ifInUcastPkts and number of input non-uncast packets if ifNUcastPkts.

Since the RMON alarm group is lack of ability to monitor an operation combination expression with multiple independent MIB objects, monitoring such an operation combination expression can only be dealt with by using the general SNMP method. For example, for error percentage of input packets of an interface, the management application program sends a SNMP get-request packet at every ten minutes interval to obtain ifInErrors, ifInUcastPkts and ifNUcastPkts, respectively; the error percentage of input packets of an interface is calculated and compared with 10% locally; when the error percentage exceeds the preset value, an alarm is sent out.

This procedure wastes not only a lot of network bandwidth, but also CPU time of the network management center. In a computer network, usually a network management center manages hundreds of routers, so if utility factors of every interface of every managed device are managed by network management center, then network bandwidth will be waste greatly and working load of the network management center will be out of its capability.

In addition, there is another limitation of RMON. When an alarm function of managed devices is set, only an operator, such as network administrator, can end the function. In practice, it is desired that an alarm function can be ended automatically after execution of a period of time, for example one day.

SUMMARY OF THE INVENTION

The invention proposes a method for remotely monitoring a network that improves the present RMON alarm group. The method supports SNMP protocols, saves network bandwidth and CPU resource of a network management center.

The technical scheme for implementing the invention is that in a remote network monitoring method, applied in a computer network including a network management center and a managed device; wherein the network management center supports SNMP implements remote network monitoring alarm, independent objects and attributes of the independent objects are configured in an MIB (Management Information Base) to monitor the managed device, the method further includes:

receiving, by the managed device, a Set-Request packet with an operation expression from the network management center to initiate a RMON monitoring process, wherein the operation expression is a four fundamental operation expression of arithmetic representing a combination object and comprises at least two independent objects;

sampling, by the managed device, values of every independent object in the expression and calculating the combination object according to the operation expression, and then comparing the calculated result with a preset threshold; when the calculated result exceeds the preset threshold, informing the network management center in real time or making a log.

The invention extends the function of RMON alarm group in the present protocol. With this extended function, a network management center can monitor and log not only any independent monitored objects such as traffic information and memory information, but also combination object combined with at least two independent objects through operation expression. In addition, monitoring duration can also be controlled, i.e., the monitoring can be ended automatically after a preset period of time, or ended by operator.

The method of the invention can be used in network devices, such as routers, bridges or switches. The monitoring content in a managed device is configured by management application program in a network management center. In this way, polling operation of a monitor is avoided and part of the management function is moved to the managed devices, so network bandwidth is saved and CPU time of a network management center is saved too.

EMBODIMENTS OF THE INVENTION

The invention will be described in detail with reference to drawings.

Figure 1:
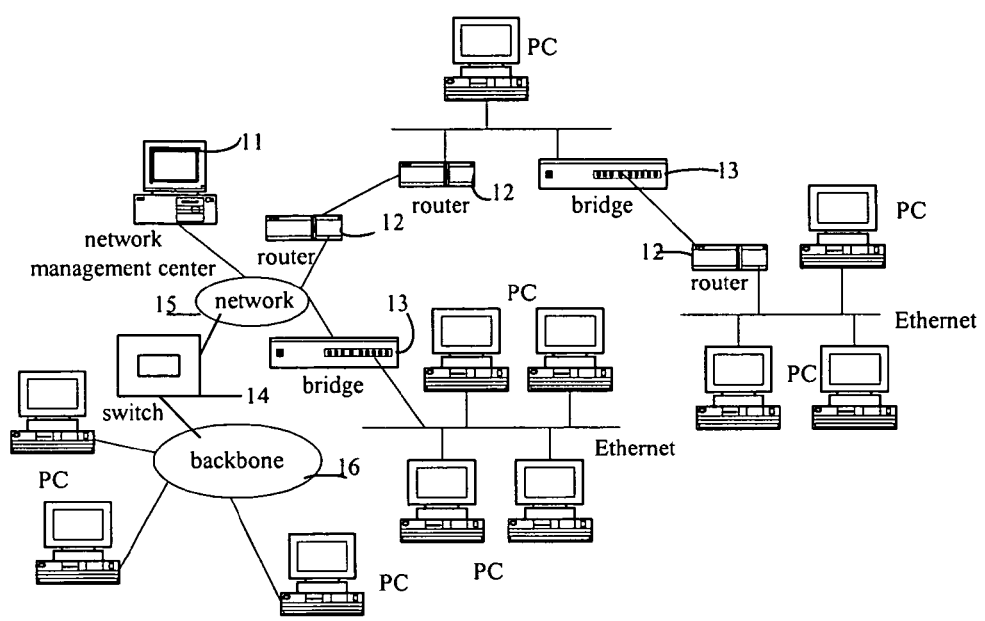
FIG. 1 shows the network environment of the invention.

As shown in FIG. 1, the invention is mainly used for network management center with management application program and for a computer communication network where a lot of routers, bridges and switches are connected.

In this network, there is a network management center 11 that supports SNMP, and there are a number of managed devices that run an agent-process set by the network management center 11. The managed devices are sub-network nodes or interface devices for network signal transmission, which supports Simple Network Management Protocol.

The managed devices include routers 12, bridges 13 and switches 14. A user PC connects with a router 12 or a bridge 13 through an Ethernet. Also a user PC connects with switch 14 through backbone network 16. The network management center 11, the routers 12, the bridges 13 and the switches 14 are mutually connected through network 15, and the network management center 11 remotely monitors the managed devices 12, 13 and 14.

In implementation of the invention, first define a set of tables in the Management Information Base (MIB): the RMON alarm-extended table, which is similar to the RMON alarm table in the alarm group but with some newly added management objects.

The RMON alarm-extended table includes a MIB managed object, called Pre-alarm Variable in this invention. The Pre-alarm Variable is similar to the alarm Variable in RMON alarm group but has an OCTET STRING data type. When an expression with multiple MIB independent objects needs to be monitored, the expression can be inputted directly.

Said expression is a character string and conforms to certain rules including the four fundamental operations of arithmetic. Suppose OID represents the managed object of MIB, and then every OID is represented with integers separated by points. For the expression: percentage of an interface input error packets=number of input error packets of the interface/ (number of input unicast packets of the interface+number of input non-unicast packets of the interface), the inputted expression is ".1.3.6.1.2.1.2.2.1.14.1/ (.1.3.6.1.2.1.2.2.1.11.1+.1.3.6.1.2.1.2.2.1.12.1)".

When a managed device has received a Set-Request packet for configuration of the Pre-alarm Variable from the network management center, first the expression is analyzed. If every managed combination object of the expression exists in agent-process of managed devices and the expression conforms to the four fundamental operations of arithmetic, the monitoring software of the managed device is initiated. At a sampling interval, the independent object is sampled and then managed combination object is calculated, and then compares with a preset threshold. When the preset threshold is exceed, an alarm will be sent, according to certain rules, to inform the network administrator for taking proactive processing.

In addition, the alarm-extended table also includes a managed combination object called Pre-alarmStatCycle. Through this Pre-alarmStatCycle, the network management center can set a time when a remote monitoring task will be ended. A remote monitoring task can be set as a permanent monitoring or a temporary monitoring task, the later will be automatically ended after a period of time.

Performance management is an important issue for network management, and interface utilization is an important evaluation parameter for performance. An interface utilization is expressed as:

((the number of the interface input bytes ifInOctets y at polling moment y−the number of the interface input bytes ifInOctets x at polling moment x)+(the number of the interface output bytes ifOutOctets y at polling moment y−the number of the interface output bytes ifOutOctets x at polling moment x))×8/((y−x )×the interface speed if Speed). The expression for interface utilization is:

Interface utilization=((ifInOctets y−ifInOctets x)+ (ifOutOctets y−ifOutOctets x))×8/((y−x)×ifSpeed);

Wherein the x and y are two different polling moments.

It can be seen from the expression that calculation of an interface utilization is complicated. With the MIB combination object defined by this invention and the expression, a network management center can remotely monitor an interface utilization of a managed device.

Communication devices, such as router etc., can share management responsibility with a network management center by using RMON alarm-extended functions defined by this invention.

Figure 2:
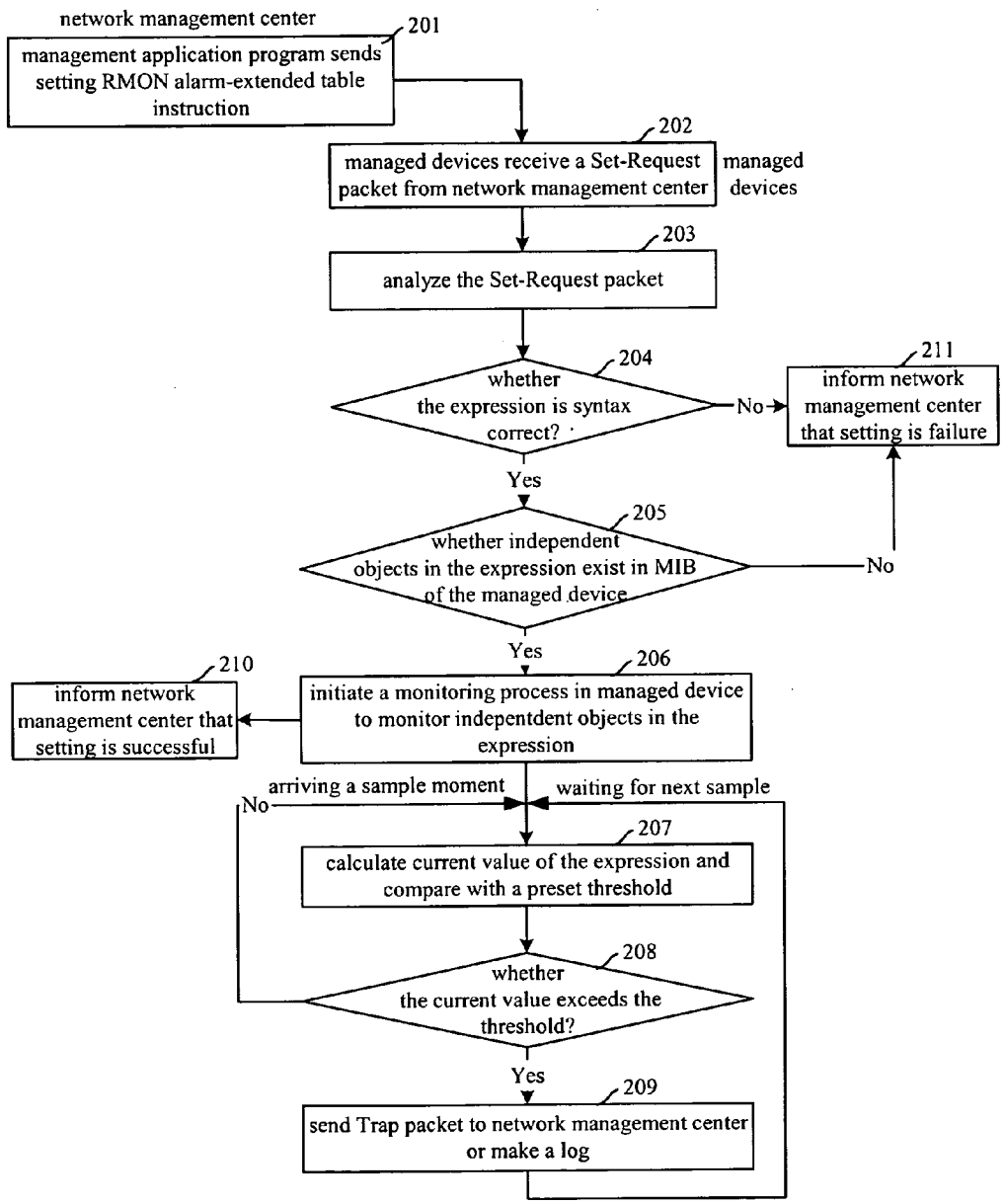
FIG. 2 shows a working flow of the invention.

FIG. 2 shows the procedure of the invention.

Step 201, a network management center runs a management application program of RMON alarm-extended and sends out an instruction for setting up a RMON alarm-extended function. Through management application program, a network administrator sends out a SNMP Set-Request packet to the managed devices for setting Pre-alarm Variable in the RMON alarm-extended table.

Steps 202 and 203, the managed devices receive and analyze the Set-Request packet to obtain data information in the Set-Request packet, i.e. a characters string.

Steps 204 and 205, the managed devices make syntax checking of the characters string to detect whether it is an expression of the four fundamental operations of arithmetic and whether every independent MIB object in this expression can be sampled. When the two checks have been passed, a setting successful information is informed to the network management center through step 210.

Step 206, for MIB combination object (Pre-alarm Variable) in the RMON alarm-extended table, the managed devices initiate a monitoring process to monitor the value of MIB combination object in the expression.

Step 207, at sample interval, a current value of the Pre-alarm Variable is calculated and compared with the threshold set by network management center.

Step 208, if the current value does not exceed the threshold, then finish this time of sampling and return to step 207 waiting for next sampling; if the current value exceeds the threshold, then go to step 209.

Step 209, the managed device makes processes according to the requirement preset by the network management center, such as sending a Trap packet to the network management center to inform the situation in real time or making a log, and then return to step 207 waiting for next sampling.

The monitoring process runs continuously until the network management center sends a stop instruction, or the monitoring process stops automatically after the Pre-alarmStatCycle exceeds the preset time.

Every device can initiate multiple monitoring processes, according to requirement of the network administrator, to help the network management center to perform monitoring functions.

Using the RMON alarm-extended function of the invention, every managed device, such as router, can be configured to monitor parameters including some individual objects of MIB or combination with multiple independent objects of MIB, which is operated by expression, such as interface utilization. Each managed device logs the monitored parameters according to configuration. When a parameter exceeds threshold, the managed device reports to the network management center, and then the network management center will make processes accordingly. For example, if utility factor of an interface exceeds 90% frequently, this means that network data volume at this interface is too large, so it is necessary to expand or to reconfigure network resource.

Applying the invention method, network management can be greatly optimized.

The invention claimed is:

1. A method for remotely monitoring a computer network, applied in a computer network comprising a network management center and a managed device, wherein the network management center supports Simple Network Management Protocol (SNMP) and implements remote network monitoring alarm, independent objects of the managed device and attributes of the independent objects are configured in a Manage Information Base (MIB) to monitor the managed device, the method comprising:

receiving, by the managed device, a Set-Request packet with an operation expression from the network management center to initiate a RMON monitoring process, wherein the operation expression is a four fundamental operation expression of arithmetic representing a combination object and comprises at least two independent objects;

parsing character-string data information of the operation expression, checking whether the character-string data information satisfies syntax rules of four fundamental operations of arithmetic, and analyzing whether all independent objects in the operation expression can be sampled at the managed device;

when the character-string data information does not satisfy the syntax rules of four fundamental operations of arithmetic or the independent objects cannot be sampled at the managed device, reporting to the network management center that the Set-Request is failure;

when the character-string data information satisfies the syntax rules of four fundamental operations of arithmetic and all the independent objects in the operation expression can be sampled at the managed device, sampling, by the managed device, values of every independent object in the operation expression and calculating said combination object according to the operation expression, and then comparing calculated result with a preset threshold; when the calculated result exceeds the threshold, informing the network management center in real time or making a log, wherein the network management center is for implementing management for the managed device.

2. The method according to claim 1, further comprising, defining a set of objects which concern about monitoring duration in an alarm-extended table; ending a monitoring process automatically until the monitoring process exceeds its monitoring duration.

3. The method according to claim 1, wherein the Set-Request packet is sent by the network management center through running an alarm-extended application program.

4. The method according to claim 1, the sampling is executed based on a preset sampling period.

5. The method according to claim 1, the combination object is OCTECT STRING data type and each of the independent objects is represented by integers separated by points.

6. The method according to claim 1, said managed device is a node device or an interface device for network signal transmission supporting SNMP of sub-networks.

7. The method according to claim 1, wherein the managed device informs said network management center by sending a Trap packet to the network management center.

* * * * *